US012468246B2

(12) United States Patent
Lee et al.

(10) Patent No.: US 12,468,246 B2
(45) Date of Patent: Nov. 11, 2025

(54) HEAT CONDUCTION MEMBER FOR PREVENTING FUSER HEATER FROM LOCAL OVERHEATING

(71) Applicant: Hewlett-Packard Development Company, L.P., Spring, TX (US)

(72) Inventors: Sunhyung Lee, Seongnam-si (KR); Hojin Ryu, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/695,790

(22) PCT Filed: May 18, 2022

(86) PCT No.: PCT/US2022/029760

§ 371 (c)(1),
(2) Date: Mar. 26, 2024

(87) PCT Pub. No.: WO2023/075862

PCT Pub. Date: May 4, 2023

(65) Prior Publication Data

US 2024/0402635 A1 Dec. 5, 2024

(30) Foreign Application Priority Data

Oct. 27, 2021 (KR) ........................ 10-2021-0144460

(51) Int. Cl.
*G03G 15/20* (2006.01)

(52) U.S. Cl.
CPC ..... *G03G 15/2053* (2013.01); *G03G 15/2064* (2013.01)

(58) Field of Classification Search
CPC ........... G03G 15/2017; G03G 15/2039; G03G 15/2042; G03G 15/2053; G03G 2215/2003
See application file for complete search history.

(56) References Cited

U.S. PATENT DOCUMENTS

| | | | |
|---|---|---|---|
| 6,423,941 | B1 | 7/2002 | Kanari et al. |
| 2015/0261145 | A1 | 9/2015 | Taguchi et al. |
| 2020/0233352 | A1 | 7/2020 | Doda et al. |
| 2021/0055679 | A1 | 2/2021 | Sato et al. |

FOREIGN PATENT DOCUMENTS

| | | | |
|---|---|---|---|
| EP | 0984339 | A2 | 3/2000 |
| JP | 2019-006466 | A | 1/2019 |

*Primary Examiner* — Thomas S Giampaolo, II
(74) *Attorney, Agent, or Firm* — Foley & Lardner LLP

(57) ABSTRACT

An example fuser includes a flexible fusing belt, a backup member located outside the fusing belt to form a fusing nip with the fusing belt, a heater substrate having a first surface including a heating element pattern and a second surface, opposite to the first surface, to heat the fusing belt in the fusing nip, and a heat conduction member in contact with the first surface of the heater substrate to distribute the heat of the heater substrate. The heating element pattern includes a first heating element having a first length greater than a width of a first print medium, and a second heating element having a second length greater than a width of a second print medium and greater than the first length.

15 Claims, 11 Drawing Sheets

HEAT CONDUCTION MEMBER FOR PREVENTING FUSER HEATER FROM LOCAL OVERHEATING

CROSS-REFERENCE TO RELATED APPLICATIONS

This application is a U.S. National Stage Patent Application under 35 U.S.C. § 371 of PCT/US2022/029760, filed May 18, 2022, which claims priority to Korean Patent Application No. 10-2021-0144460, filed Oct. 27, 2021, which are hereby incorporated by reference in their entireties.

BACKGROUND

An electro-photographic printer may form a visible toner image on an image receptor by supplying a toner to an electrostatic latent image formed on the image receptor, transfer the toner image to a print medium, and fuse the transferred toner image on the print medium.

The fusing process may involve applying heat and pressure to the toner. A fuser may include a heating member and a pressurization member to engage with each other to form a fusing nip. The heating member may be heated through a heater. The print medium onto which the toner image is transferred may receive heat and pressure while passing through the fusing nip, and the toner image may be fused on the print medium.

BRIEF DESCRIPTION OF THE DRAWINGS

Various examples will be described below by referring to the following figures.

DETAILED DESCRIPTION

An electro-photographic image forming apparatus may include a print unit to form a visible toner image on a print medium, for example, a piece of paper, and a fuser to fuse the toner image on the print medium. The print unit may include an exposure device, a photosensitive drum, a developing device, a transfer device, and the like. The exposure device may irradiate light modulated in accordance with image information to the photosensitive drum charged to a uniform surface potential, and form an electrostatic latent image on the photosensitive drum. The developing device may supply toner to the electrostatic latent image formed on the photosensitive drum to develop the electrostatic latent image into a toner image. The transfer device may transfer the toner image formed on the photosensitive drum to the print medium. The toner image transferred to the print medium may be maintained on the print medium by an electrostatic force. The fuser may fuse the toner image transferred to the print medium by applying heat and pressure.

To improve print speed and decrease energy consumption, a portion to be heated having a small thermal capacity may be used in the fuser. For example, as a portion to be heated, a thin film-shaped fusing belt may be used. By using the fusing belt, a temperature of the fusing belt may be quickly increased to a temperature in which fusing is possible, and printing may be possible in a short time after turning on a printer.

Figure 1:
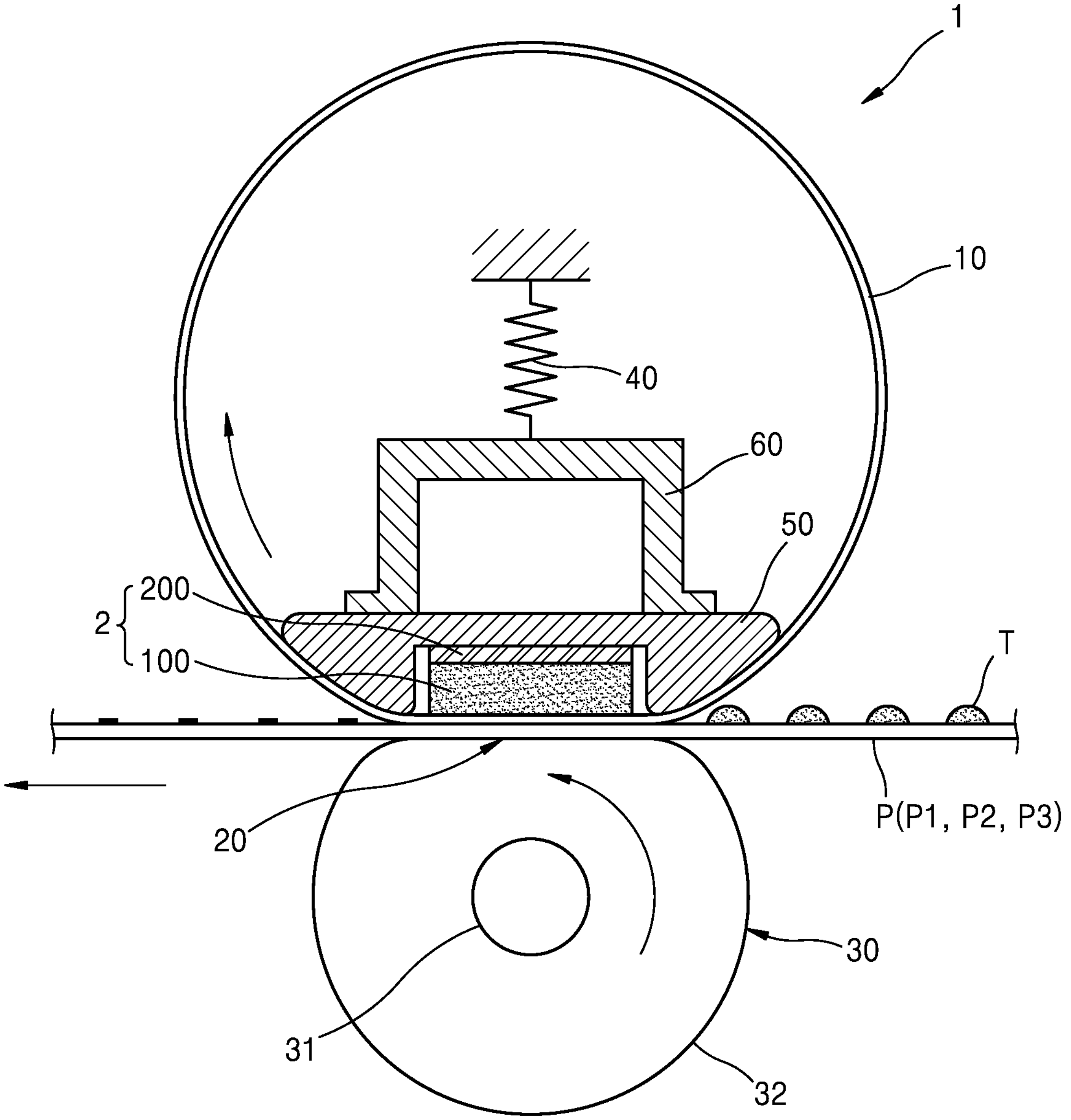
FIG. 1 is a schematic structural diagram of a fuser, according to an example.
Figure 2:
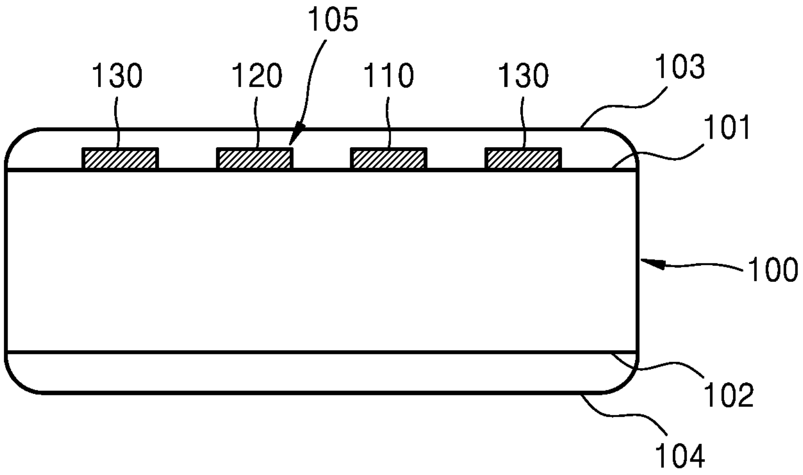
FIG. 2 is a schematic cross-sectional view of a heater substrate illustrated in FIG. 1, according to an example.
Figure 3:
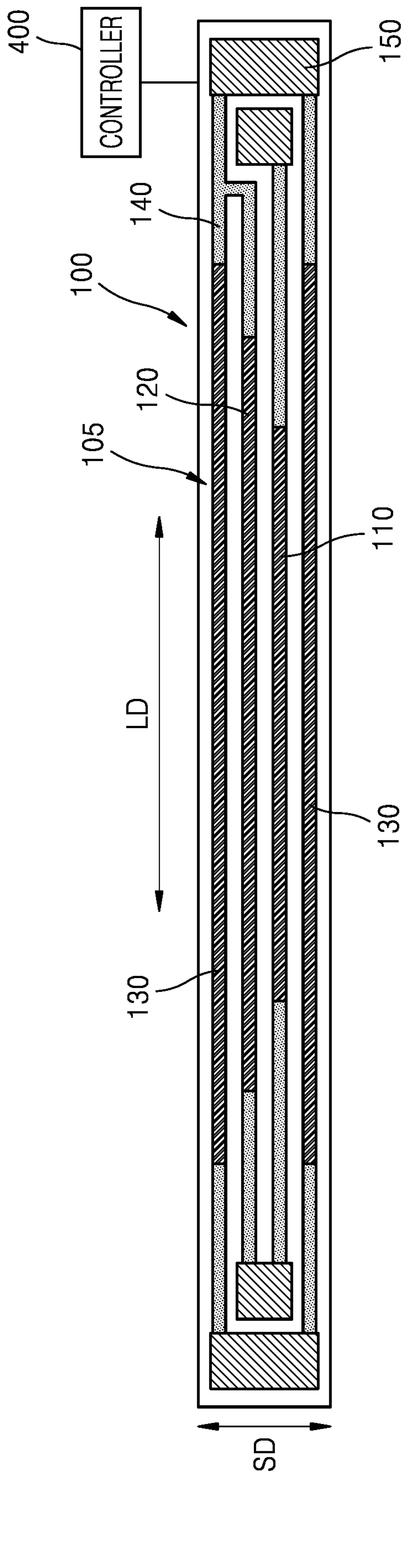
FIG. 3 is a schematic plan view of the heater substrate illustrated in FIG. 1, according to an example.
Figure 4:
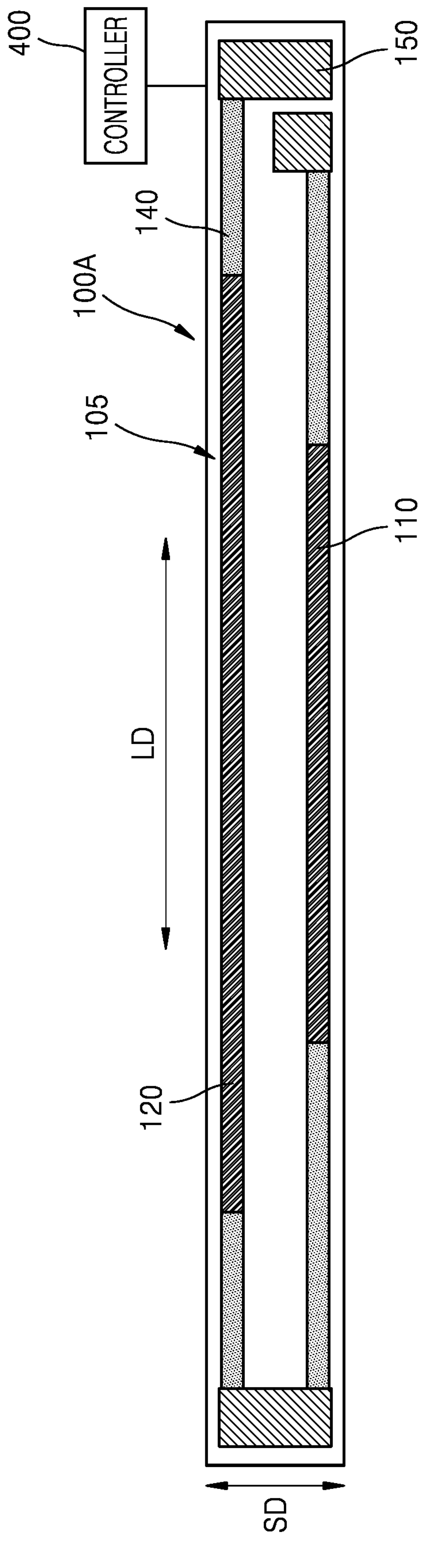
FIG. 4 is a schematic plan view of the heater substrate illustrated in FIG. 1, according to another example.

FIG. 1 is a schematic structural diagram of a fuser 1 according to an example. FIG. 2 is a schematic cross-sectional view of a heater substrate 100 illustrated in FIG. 1 according to an example, and FIG. 3 is a schematic plan view of the heater substrate 100 illustrated in FIG. 1 according to an example. FIG. 4 is a schematic plan view of the heater substrate 100A illustrated in FIG. 1 according to another example.

Referring to FIGS. 1 to 3, the fuser 1 may include a flexible fusing belt 10, a backup member 30 located outside the fusing belt 10 to form a fusing nip 20 with the fusing belt 10, a heater substrate 100 having a first surface 101 including a heating element pattern 110 and a second surface 102 opposite to the first surface 101 to heat the fusing belt 10 in the fusing nip 20, and a heat conduction member 200 in contact with the first surface 101 of the heater substrate 100 to distribute heat of the heater substrate 100. A plate heater 2 may include the heater substrate 100 and the heat conduction member 200.

The heater substrate 100 may be located at an inner side of the fusing belt 10 and may heat the fusing belt 10 to heat various sizes of print media. The heater substrate 100 may heat the fusing belt 10 in the fusing nip 20 to heat a first print medium P1, a second print medium P2 having a greater width than the first print medium P1, or a third print medium P3 having a greater width than the second print medium P2.

The backup member 30 is located outside the fusing belt 10 to face the heater substrate 100. A pressurization member 40 may provide a pressing force to at least one of the heater substrate 100 or the backup member 30. The fusing nip 20 is formed by the heater substrate 100 and the backup member 30 being pressed toward each other through the pressing force of the pressurization member 40. The heater substrate 100 is to heat the fusing belt 10 in the fusing nip 20 to heat print mediums P of various widths. Based on the print medium P having a toner image T formed on the surface passing through the fusing nip 20, the toner image T may be fused on the print medium P by heat and pressure.

The fusing belt 10 may include a flexible base layer (not shown). The base layer may include a thin metal film such as stainless steel, nickel, copper-nickel, or the like. The base layer may include a polymer film having heat resistance and abrasion resistance to withstand the fusing temperature, such as a polyimide film, a polyamide film, a polyimideamide film, or the like. A release layer (not shown) may be provided on a surface of the backup member 30 side of the base layer or on both sides of the base layer. The release layer may include a resin layer having separability properties. The release layer may include perfluoroalkoxy (PFA), polytetrafluoroethylenes (PTFE), fluorinated ethylene prophylene (FEP), or the like. In order to provide a relatively wide and flat fusing nip 20, an elastic layer (not shown) may be interposed between the base layer and the release layer. The elastic layer may include a material having a heat resistance to withstand the fusing temperature. For example, the elastic layer may include a rubber material such as a fluorine rubber, a silicone rubber, etc.

The backup member 30 may have a shape of a roller to move the fusing belt 10. For example, the backup member 30 may be pressed against the heater substrate 100 with the fusing belt 10 therebetween and rotated to move the fusing belt 10. In an example, the backup member 30 may include a core 31 extending in a long side direction LD, and an elastic layer 32 on an outer periphery of the core 31. The core 31 may include, for example, a metal shaft, a metal cylinder, and the like. In an example, the elastic layer 32 may include a rubber, a thermoplastic elastomer, and the like. A release layer (not shown) may be included on the outer surface of the elastic layer 32. The release layer may include perfluoroalkoxy (PFA), polytetrafluoroethylenes (PTFE), fluorinated ethylene prophylene (FEP), or the like.

The pressurization member 40 may provide a pressing force toward the backup member 30 to the heater substrate 100. For example, the pressurization member 40 may provide a pressing force to a heater holder 50 supporting the heater substrate 100 or a pressurization bracket 60 connected to the heater holder 50. The structure of providing a pressing force to the heater substrate 100 is not limited to the example structure shown in FIG. 1.

Referring to FIGS. 2 and 3, the heater substrate 100 may include a heat conduction substrate. For example, the heater substrate 100 may include a ceramic substrate. As a ceramic material, for example, alumina ($Al_2O_3$), aluminum nitride (AlN), etc. may be used. The heater substrate 100 may include the first surface 101 and the second surface 102. The first surface 101 of the heater substrate 100 may include the heating element pattern 110, a conductor pattern 140 to provide a conductive passage, and an electrode 150 to provide power.

An electric insulating layer 103 may be provided on the first surface 101 of the heater substrate 100. The electric insulating layer 103 may cover the heating element pattern 105, the conductor pattern 140, and the electrode 150. The electric insulating layer 103 may function as a protective layer to protect the heating element pattern 105, the conductor pattern 140, and the electrode 150. The electric insulating layer 103 may be, for example, a glass layer. The second surface 102 of the heater substrate 100 may face the fusing belt 10. The second surface 102 may be in frictional contact with the fusing belt 10. In order to prevent abrasion of the heater substrate 100 or the fusing belt 10, an abrasion prevention layer 104 may be provided on the second surface 102. The abrasion prevention layer 104 may include a material having a small coefficient of friction. The abrasion prevention layer 104 may be, for example, a glass layer.

The heating element pattern 105 may receive electric energy through the electrode 150 and the conductor pattern 140 to thereby generate heat. The heating element pattern 105 may include a plurality of heating elements arranged to be apart from each other in a short side direction SD. The heating element pattern 105 may include, for example, a metal heating material such as silver-palladium (Ag—Pd) alloy. The heater substrate 100 may be heated by the heating of the heating element pattern 105, and the temperature of the heater substrate 100 may reach the fusing temperature, for example, about 80° C. to about 150° C.

Referring to FIG. 3, the heating element pattern 105 may include heating elements having different lengths. For example, the heating element pattern 105 may include a first heating element 110 having a first length L1 (refer to FIG. 5) and a second heating element 120 having a second length L2 (refer to FIG. 5). The heating element pattern 105 may include a pair of third heating elements 130 having a third length L3 (see FIG. 5) that is greater than the second length L2. In this regard, the length is defined as a length in the long side direction LD of the heater substrate 100.

The pair of third heating elements 130 may be disposed at both end portions of the heater substrate 100 in the short side direction, and the first heating element 110 and the second heating element 120 may be disposed between the pair of third heating elements 130. The first heating element 110, the second heating element 120, and the pair of the third heating elements 130 may be arranged to be apart from each other in the short side direction SD. The first heating element 110, the second heating element 120, and the third heating element 130 may be arranged symmetrically with respect to the center of the long side direction LD.

A controller 400 may selectively control the driving of the first heating element 110, the second heating element 120, and the third heating element 130, depending on the type of the print medium. For example, to heat the first print medium P1 (refer to FIG. 5) having the smallest width, the controller 400 may drive the shortest first heating element 110. To heat the second print medium P2 (refer to FIG. 5) having a greater width than the first print medium P1, the controller 400 may drive the second heating element 120 that is longer than the first heating element 110. To heat the third print medium P3 (refer to FIG. 5) having a greater width than the second print medium P2, the controller 400 may drive the third heating element 130 that is longer than the first second heating element 120. By selectively controlling the driving of the heating elements having different lengths, a phenomenon in which some areas of the print medium are overheated during the process of heating the print media having different widths may be prevented. Here, the width of the print medium is defined as a length in the long side direction LD of the heater substrate 100.

Based on the heating element pattern 105 having a structure in which the lengths of the plurality of heating elements are all the same, to cover the print media P1, P2, and P3 having various widths, each of the plurality of heating elements may have lengths corresponding to the length of the third print medium P3 having the greatest width. Based on the print media P1 and P2 having smaller widths than the greatest width being heated, in such a structure of the heating element pattern 105, heat is transferred to the print media P1 and P2 in an overlapping area in which the heating elements overlap with the print media P1 and P2, to maintain the fusing temperature. However, in a non-overlapping area in which the heating elements do not overlap with the print media P1 and P2, heat is not transferred to the print media P1 and P2, which may cause overheating of the non-overlapping area due to exceeding the fusing temperature.

According to an example, by including heating elements with different lengths to correspond to the various widths of the print media P1, P2, and P3, a phenomenon in which some areas of the heating elements are overheated may decrease even during the heating of the print media P1, P2, and P3 having different widths.

Although an example of the heating element pattern 105 is described above to include the first heating element 110, the second heating element 120, and the third heating elements 130, the heating element pattern 105 is not limited thereto, and may be variously modified to any structure including heating elements having different lengths. For example, as shown in FIG. 4, the heating element pattern 105 of a heater substrate 100A may include the first heating element 110 and the second heating element 120, without including the third heating element 130.

In the process of the print medium P being inserted into the fusing nip 20 or passing through the fusing nip 20, the print medium P may be slightly shaken or otherwise misaligned in a direction perpendicular to the moving direction. Thus, an alignment offset of the print medium P may occur. In this regard, the first heating element 110, the second heating element 120, and the third heating element 130 are designed to be slightly longer than the corresponding widths of the print media P1, P2, and P3.

Figure 5:
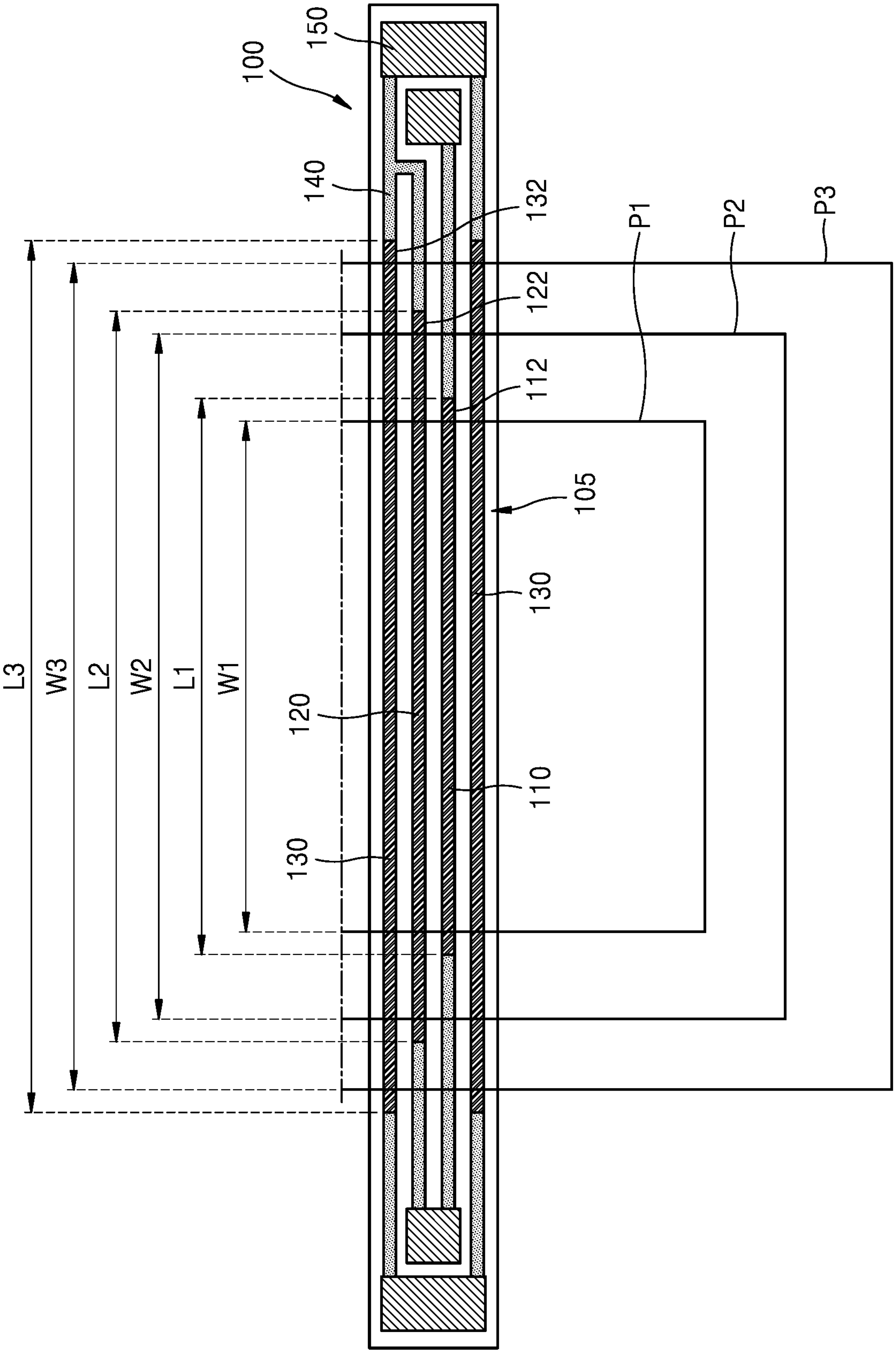
FIG. 5 is a diagram for explaining a relation between a heating element pattern of a heater substrate and a print medium, according to an example.

FIG. 5 is a diagram for explaining a relationship between the heating element pattern 105 of the heater substrate and the print media P1, P2, and P3 according to an example. Referring to FIG. 5, the first length L1 of the first heating element 110 is greater than a width W1 of the first print medium P1, and the second length L2 of the second heating element 120 is greater than a width W2 of the second print medium P2. The third length L3 of the third heating element 130 is greater than a width W3 of the third print medium P3.

Accordingly, during the heating of the first print medium P1, at least a portion of both end portions of the first heating element 110 does not overlap with the first print medium P1. During the heating of the second print medium P2, at least a portion of both end portions of the second heating element 120 does not overlap with the second print medium P2. During the heating of the third print medium P3, at least a portion of both end portions of the third heating element 130 does not overlap with the third print medium P3. The length of an area 112 in which the first heating element 110 does not overlap with the first print medium P1 at the end portion of the first heating element 110 may be about 3 mm to about 5 mm. The length of an area 122 in which the second heating element 120 does not overlap with the second print medium P2 at the end portion of the second heating element 120 may be about 3 mm to about 5 mm. The length of an area 132 in which the third heating element 130 does not overlap with the third print medium P3 at the end portion of the third heating element 130 may be about 3 mm to about 5 mm.

As described above, in the heating element pattern 105 according to an example, although not great in length, an area 112 in which the first heating element 110 and the first print medium P1 do not overlap, an area 122 in which the second heating element 120 and the second print medium P2 do not overlap, an area 132 in which the third heating elements 130 and the third print medium P3 do not overlap may be generated, and the areas may act as another cause of local overheating of the heater substrate 100.

Figure 6:
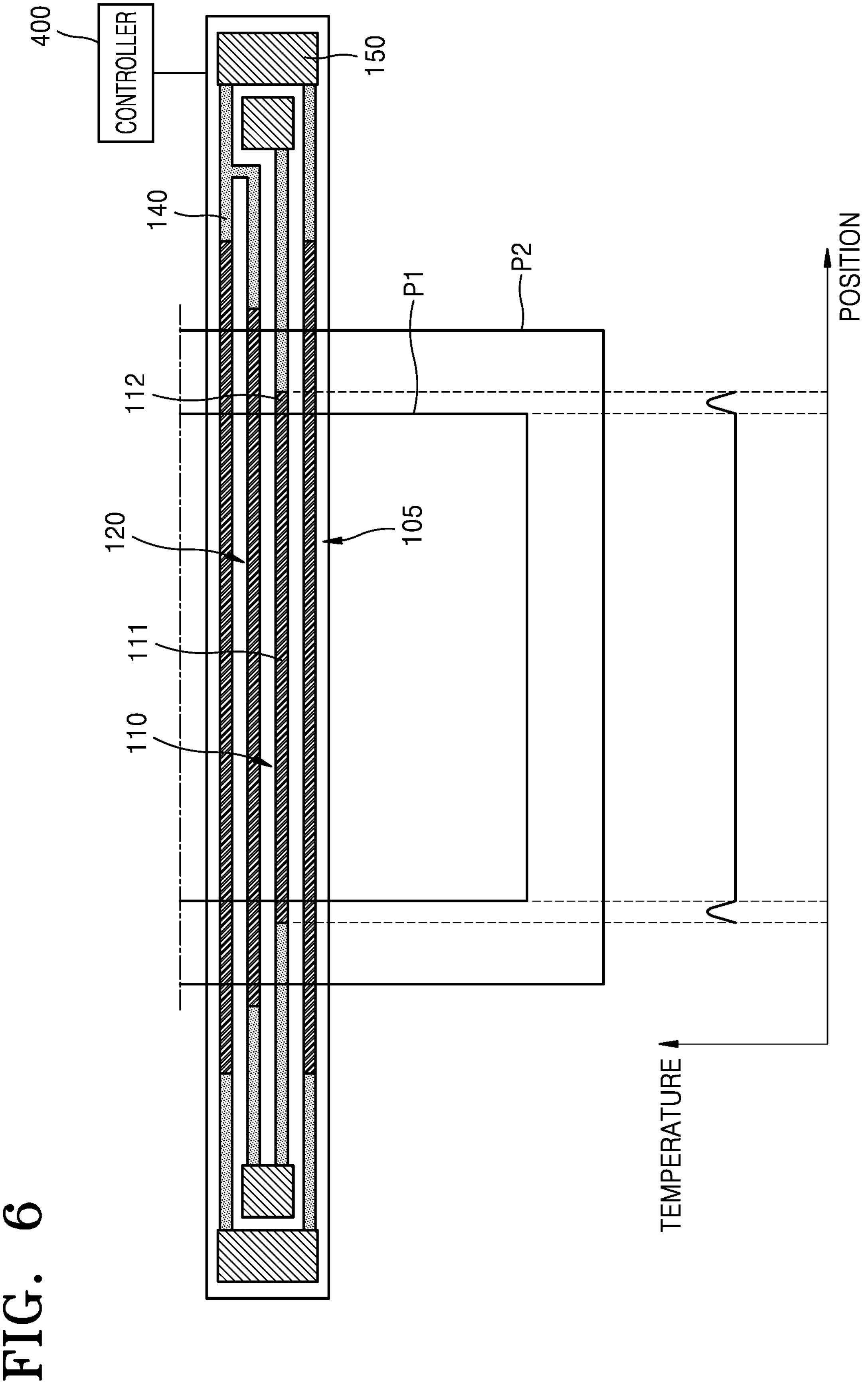
FIG. 6 is a diagram for explaining a temperature gradient of a first heating element based on the print medium passing through the fusing nip in the fuser according to an example.

FIG. 6 is a diagram for explaining a temperature gradient of the first heating element 110 based on the first print medium P1 passing through the fusing nip in the fuser 1, according to an example. Referring to FIG. 6, the first heating element 110 includes a first heating area 111 which overlaps with the first print medium P1, and the second heating area 112 which does not overlap with the first print medium P1 and extends from both end portions of the first heating area 111.

The first heating area 111 overlaps with the first print medium P1, thereby transferring heat to the first print medium P1, while the second heating area 112 does not overlap with the first print medium P1, thereby transferring less heat to the first print medium P1. The first heating area 111 may be referred to as a contact area that transmits heat to the first print medium P1, and the second heating area 112 may be referred to as a non-contact area that does not transmit heat to the first print medium P1. The second heating area 112 may be overheated because less heat is transmitted to the first print medium P1, and may have a higher temperature than the fusing temperature used for fusing. In this case, the quality of fusing of the second print medium P2 performed immediately after heating the first print medium P1 may be deteriorated.

For example, heating of the second print medium P2 having a greater width than that of the first print medium P1 may be performed after heating of the first print medium P1 is performed in a state in which the second heating area 112 is overheated. In this case, the controller 400 may stop the driving of the first heating element 110 and drive the second heating element 120 to heat the second print medium P2. Based on the second print medium P2 being heated right after the first print medium P1, even based on the driving of the first heating element 110 being stopped, the temperature of the second heating area 112 of the first heating element 110 may temporarily be higher than the fusing temperature. The temperature of an area corresponding to the second heating area 112 in the fusing belt 10 heating the second print medium P2 may increase to be higher than the surrounding temperature, thereby decreasing the image quality of the second print medium P2.

To prevent the deterioration of the image quality due to the second heating area 112, the fuser 1 according to an example includes the heat conduction member 200 to disperse the heat of the heater substrate 100.

Figure 7:
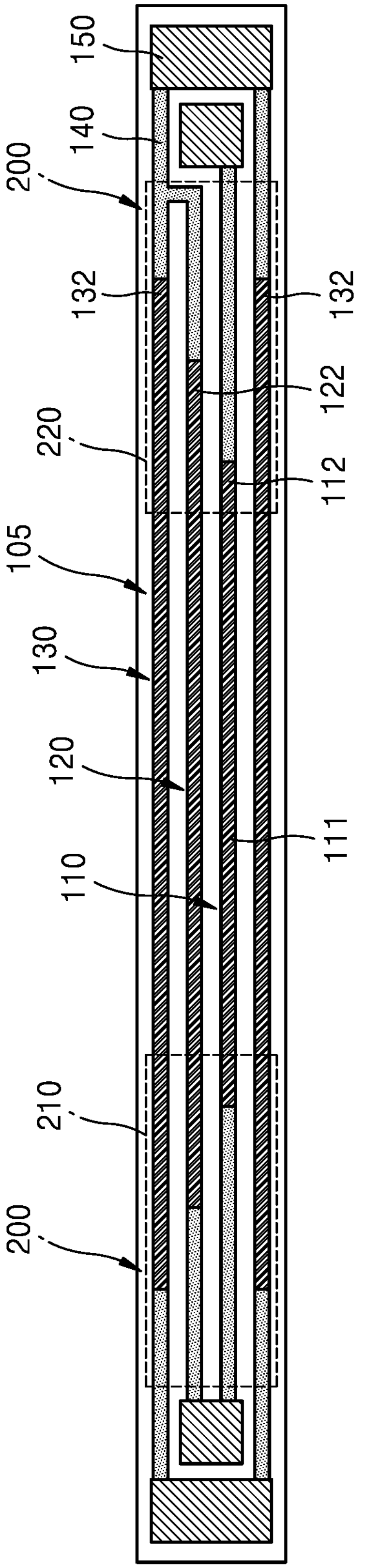
FIG. 7 is a diagram for explaining a plate heater including a heat conduction member, according to an example.
Figure 8:
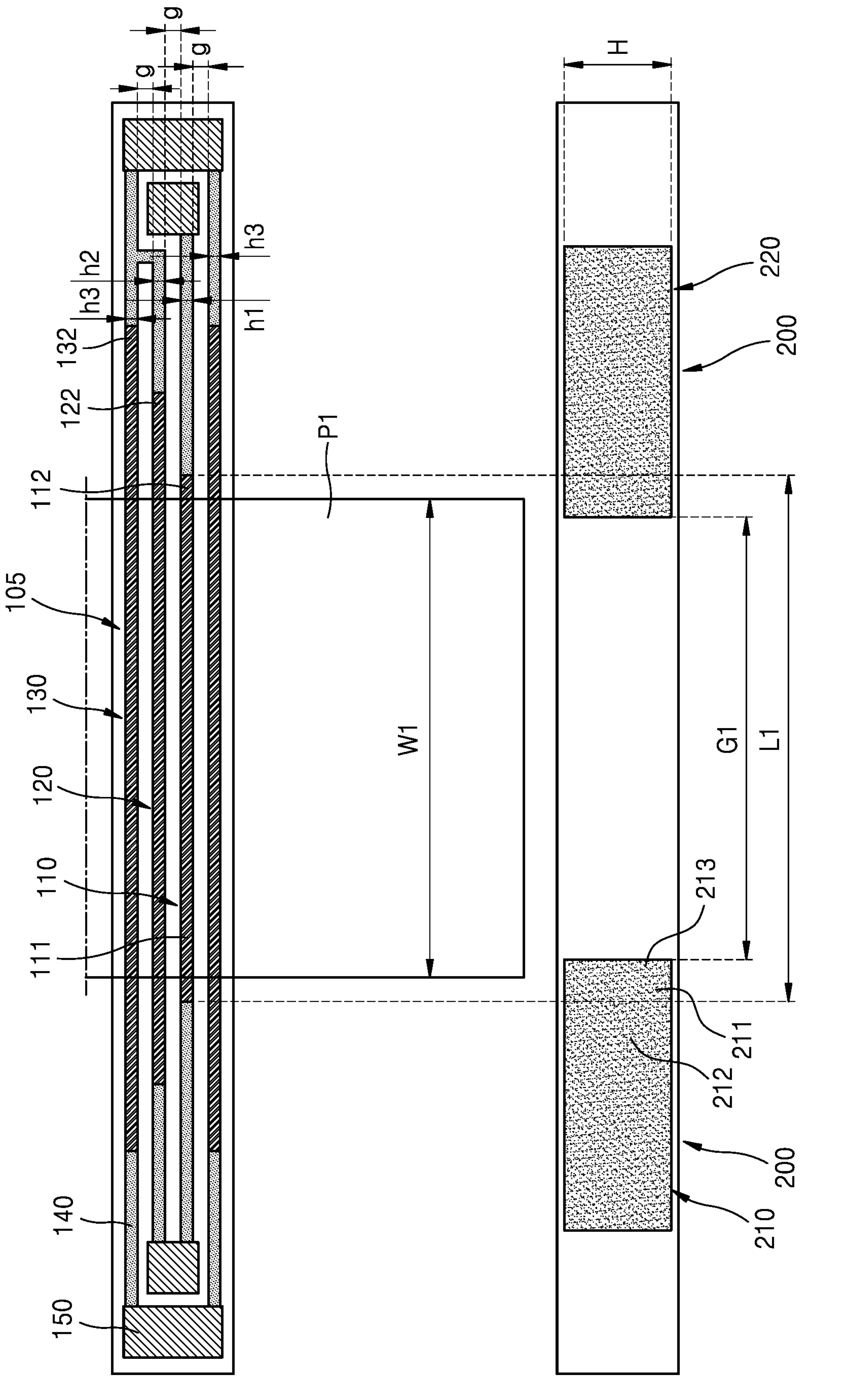
FIG. 8 is a diagram for explaining an arrangement of the print medium, the heating element pattern, and the heat conduction member of FIG. 7, according to an example.

FIG. 7 is a diagram for explaining a plate heater including a heat conduction member 200 according to an example, and FIG. 8 is a diagram for explaining an arrangement of the first print medium P1, the heating element pattern 105, and the heat conduction member 200 of FIG. 7 according to an example.

Referring to FIGS. 7 and 8, the plate heater includes the heat conduction member 200 to contact the first surface 101 of the heater substrate 100 and disperse the heat of the heater substrate 100. In this regard, "being in contact with the first surface 101 of the heater substrate 100" indicates that the heat conduction member 200 in in contact with the outermost surface of the heater substrate 100 where the heating element pattern 105 is formed. In an example, the heat conduction member 200 may be in contact with the electric insulating layer 103 covering the heating element pattern 105. Based on another material layer being present on the outside of the electric insulating layer 103, the heat conduction member 200 may be in contact with the material layer. The heat conduction member 200 may be adhered to the first surface 101 of the heater substrate 100 by a heat conduction adhesive. The heat conduction member 200 may be fixed to the first surface 101 of the heater substrate 100 by a fixing member (not shown). The heat conduction member 200 may be located on the first surface 101 of the heater substrate 100 and may be pressed toward the first surface 101 by, for example, the heater holder 50 or another member.

The heat conduction member 200 may include a material having a high heat conductivity, for example, a metal sheet such as aluminum, a graphite sheet, and the like. The thermal capacity of the heat conduction member 200 may be smaller than the thermal capacity of the heater substrate 100. The thermal capacity of the heat conduction member 200 may be adjusted by size. By reducing a thickness of the heat conduction member 200, a heat conduction member 200 having small thermal capacity may be implemented. The thickness of the heat conduction member 200 may be less than the thickness of the heater substrate 100. The thickness of the heat conduction member 200 may be equal to or less than half the thickness of the heater substrate 100. For example, the thickness of the heat conduction member 200 may be about 30 μm to about 500 μm.

Referring to FIG. 8, a portion of the heat conduction member 200 may be arranged to overlap with the second heating area 112 of the first heating element 110. For example, the heat conduction member 200 may include a first heat conduction area 211 that overlaps with the second heating area 112, and a second heat conduction area 212 that extends from one end portion of the first heat conduction area 211 and does not overlap with the first heating element 110. A width of the first heat conduction area 211 may be the same as a difference (=L1-W1) between the first length L1 of the first heating element 110 and the width W1 of the first print medium P1. The width of the first heat conduction area 211 may be from about 3 mm to about 5 mm.

The heat conduction member 200 may further include a third heat conduction area 213 which may extend from another end portion of the first heat conduction area 211 and overlap with the first heating area 111. Through the third heat conduction area 213, even based on the first print medium P1 being shaken in a direction perpendicular to the moving direction, the heat conduction member 200 may overlap with the overheated area of the first heating element 110 and uniformly maintain the temperature of the heater substrate 100.

The heat conduction member 200 may be arranged so as not to overlap with the electrode 150 for supplying power to the heating element pattern 105. For example, in the heat conduction member 200, the second heat conduction area 212 located at the end portion in the long side direction LD may be arranged so as not to overlap with the electrode 150. Thus, it is possible to prevent unintentional heating of the electrode 150 by heat transferred to the heat conduction member 200.

The heat conduction member 200 may include a pair of heat conduction segments 210 and 220 including the first heat conduction area 211, the second heat conduction area 212, and the third heat conduction area 213. An interval G1 between the pair of heat conduction segments 210 and 220 may be less than a width W1 of the first print medium P1. An interval between the third heat conduction areas 213 of the pair of heat conduction segments 210 and 220 may be less than the width W1 of the first print medium P1. The width of the third heat conduction area 213 may correspond to the width of the first heat conduction area 211. The width of the third heat conduction area 213 may be from about 3 mm to about 5 mm.

The heat conduction member 200 may be disposed to overlap with the first heating element 110 and the second heating element 120. For example, the heat conduction member 200 may be disposed to overlap with the first heating element 110, the second heating element 120, and the third heating element 130. The heat conduction member 200 may rapidly disperse the heat generated in the second heating area 112 of the first heating element 110, and may rapidly disperse local overheating generated in the second heating element 120 and the third heating element 130.

The heat conduction member 200 may have a height H along the short side direction SD to overlap with the first heating element 110 and the second heating element 120. For example, the height H along the short side direction SD of the heat conduction member 200 may be greater than a sum of a height h1 of the first heating element 110, a height h2 of the second heating element 120, and an interval g between the first heating element 110 and the second heating element 120. The heat conduction member 200 may have a height H along the short side direction SD to overlap with the first heating element 110, the second heating element 120, and the pair of third heating elements 130. The height H of the heat conduction member 200 may be equal to or greater than a sum of the height h1 of the first heating element 110, the height h2 of the second heating element 120, heights (2*h3) of the pair of third heating elements 130, the interval g between the third heating element 130 and the first heating element 110, the interval g between the first heating element 110 and the second heating element 120, and the interval g between the second heating element 120 and the third heating element 130 ($H \geq h1+h2+2*h3+3*g$). The height H along the short side direction SD of the heat conduction member 200 is less than the height along the short side direction SD of the heater substrate 100.

Based on the example above, overheating of the second heating area 112 of the first heating element 110 by the heat conduction member 200 may be prevented. However, the function of the heat conduction member 200 is not limited thereto and may prevent the non-contact areas 122 and 132 of the second heating element 120 or the third heating element 130 from being overheated.

In examples as described above, the heat conduction member 200 is a rectangular structure. However, the structure of the heat conduction member 200 is not limited thereto and may be variously modified to any structure of which the length may be overlapped with the areas 112, 122, and 132 of the plurality of heating elements 110, 120, and 130 in which overheating may be generated.

Figure 9:
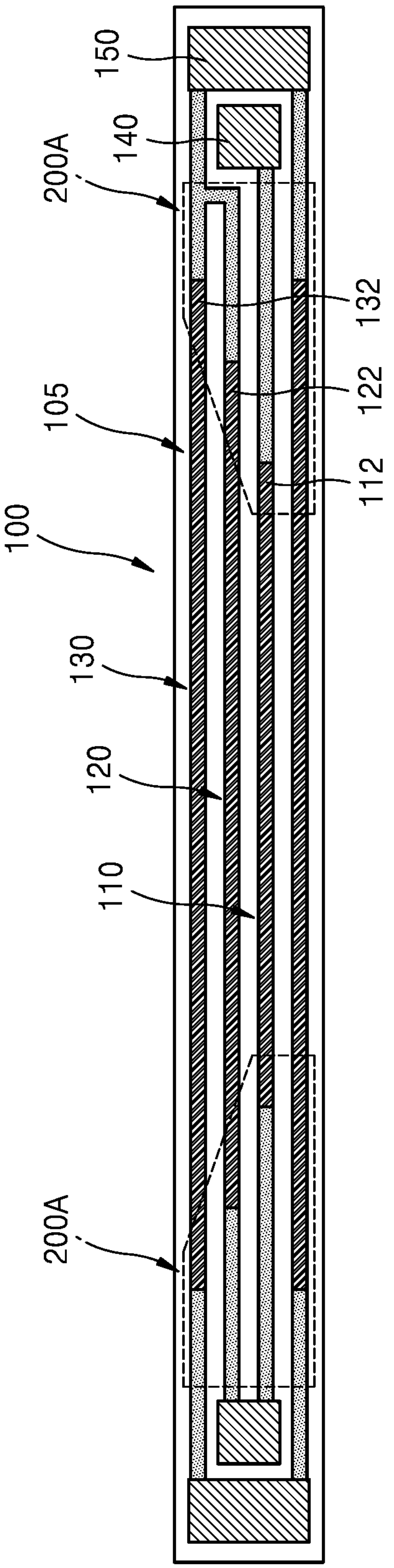
FIGS. 9 and 10 are diagrams of a heat conduction member, according to various examples.
Figure 10:
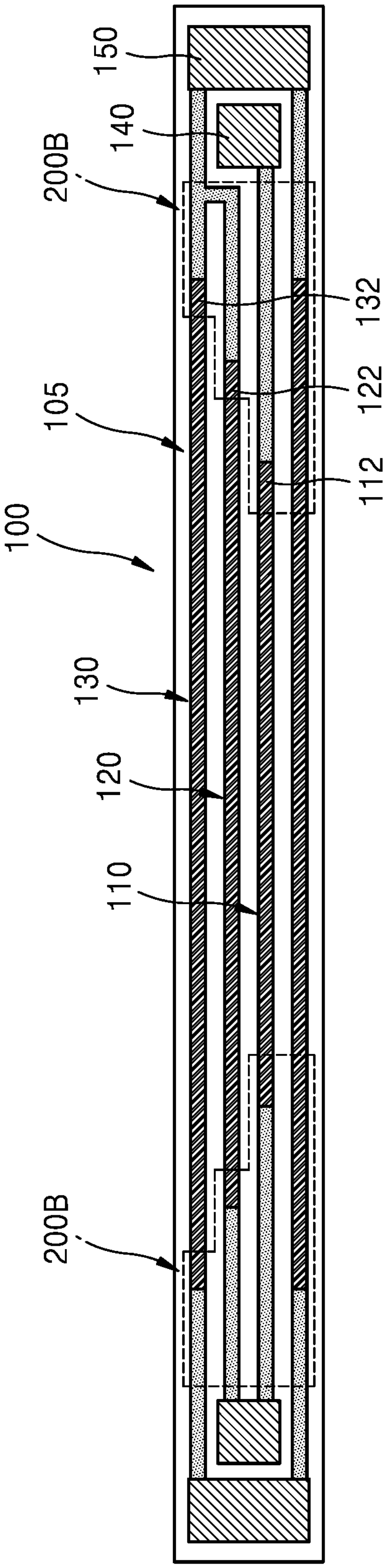

FIGS. 9 and 10 are diagrams of a heat conduction member, according to various examples. Referring to FIGS. 9 and 10, the heat conduction members 200A and 200B may have a structure in which the heights increase continuously or in stages toward both ends in the long side direction LD such that the heat conduction members 200A and 200B overlap with the second heating areas 112, 122, and 132 of the first heating element 110, the second heating element 120, and the third heating element 130.

Figure 11:
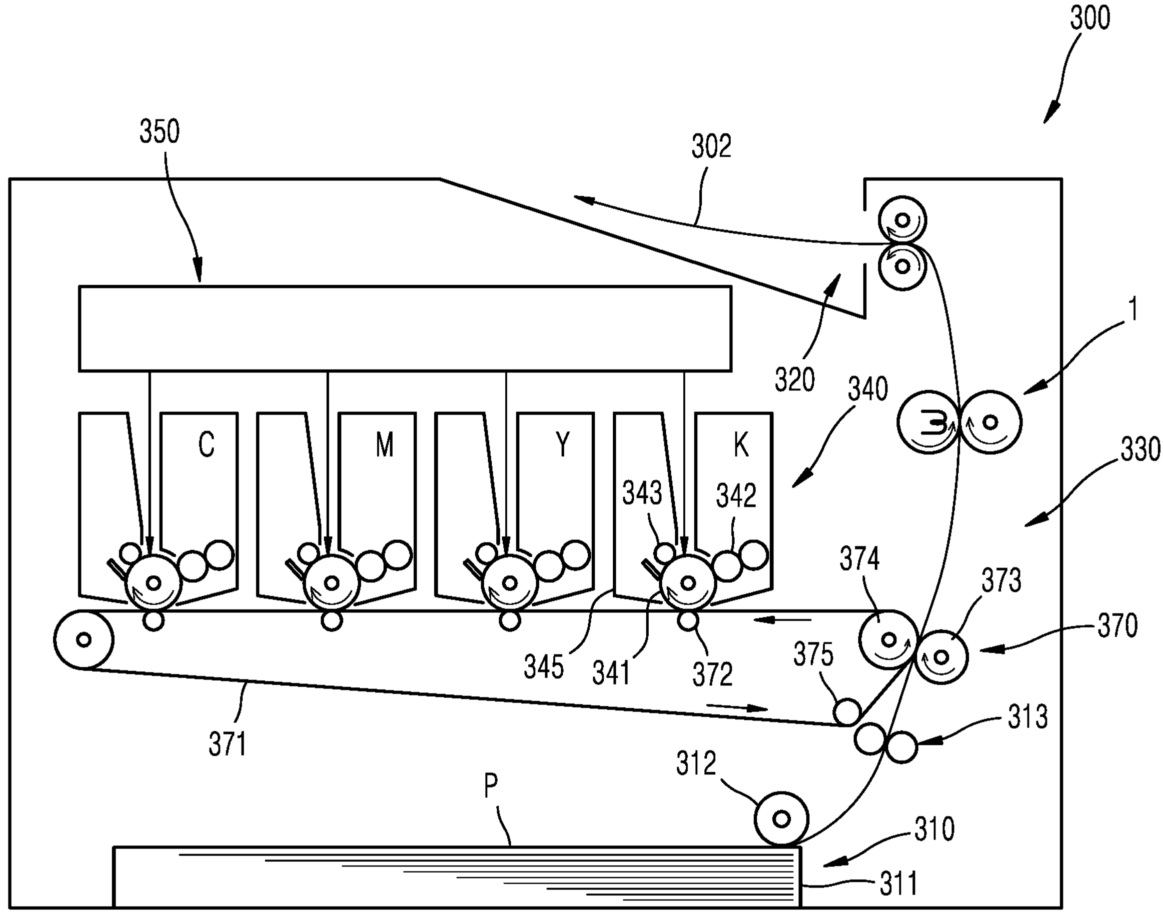
FIG. 11 is a diagram illustrating an image forming apparatus including a fuser according to an example.

FIG. 11 is a diagram illustrating an image forming apparatus 300 including the fuser 1 according to an example. Referring to FIG. 11, the image forming apparatus 300 includes an image forming unit 330 to transfer a toner image to the print medium P, and the fuser 1 according to the above described examples to apply heat and pressure to the print medium P to which the toner image is transferred to fuse the toner image on the print medium P. The image forming apparatus 300 may supply the print media P to the image forming unit 330, and may further include a feeder 310, and a discharging unit 320 onto which the print medium P on which the toner image is fused is loaded. A printing path 302 connects the feeder 310 and the discharging unit 320. The print medium P may include the first print medium P1, the second print medium P2 (refer to FIG. 5) having a greater width than that of the first print medium P1 (refer to FIG. 5), and the third print medium P3 (refer to FIG. 5) having a greater width than that of the second print medium P2 (refer to FIG. 5).

The print medium P loaded on the feeder 310 may be drawn out one by one and transferred along the printing path 302. In this regard, a pickup roller 312 may draw the print medium P one by one from a feeding tray 311. Transfer rollers 313 transfer the drawn out print medium P along the printing path 302.

In an example, although the feeder 310 is illustrated in the form of a feeding cassette, examples of the feeder 310 are not limited thereto.

The image forming unit 330 may transfer the toner image to the print medium P conveyed along the printing path 302. The image forming unit 330 may include a developing device 340, an exposure device 350, and a transfer device 370.

The image forming unit 330 according to an example may selectively print a monochromatic image or a color image on the print medium P.

For color printing, the developing device 340 may include four developing devices 340 to develop an image in colors of, for example, cyan C, magenta M, yellow Y, and black K. The four developing devices 340 may accommodate developers, for example, toners, in the colors of cyan C, magenta M, yellow Y, and black K, respectively. The toners in colors of cyan C, magenta M, yellow Y, and black K may each be accommodated in four toner supply containers 345, and toners in colors of cyan C, magenta M, yellow Y, and black K may be supplied to the four developing devices 340 from the four toner supply containers 345. The image forming apparatus 300 may further include a developing device to accommodate and develop toners of various colors such as light magenta, white, etc., in addition to the colors described above. The respective toner supply container 345 may be replaced based on the accommodated toner being consumed. The developing device 340 may be attached to and detached from the image forming apparatus 300 through a door (not shown).

Hereinafter, in an example image forming unit 330 having four developing devices 340, unless mentioned otherwise, each of the elements to which C, M, Y, and K are added as reference signs indicate elements for developing images in colors of cyan C, magenta M, yellow Y, and black K.

The developing device 340 may supply a toner accommodated therein to an electrostatic latent image formed on a photosensitive drum 341.

The photosensitive drum 341 is an example of a photoconductor on which an electrostatic latent image may be formed on the surface, and may include a conductive metal pipe and a photosensitive layer formed on an outer periphery thereof. A charging roller 342 may charge the surface of the photosensitive drum 341 to a uniform potential.

The exposure device 350 may irradiate light modulated in accordance with image information to the photosensitive drum 341 and form an electrostatic latent image on the photosensitive drum 341. Examples of the exposure device 350 include a laser scanning unit (LSU) using a laser diode as a light source, and a light emitting diode (LED) exposure device using an LED as a light source.

A developing roller 343 may develop the electrostatic latent image to a visible toner image by supplying a developer accommodated in the developing device 340, for example, a toner to the photosensitive drum 341. A developing bias voltage may be applied to the developing roller 343. Based on a one-component developing method being used, a toner may be accommodated in the toner supply container 345 of the developing device 340. Based on a two-component developing method being used, a toner or a toner and a carrier may be accommodated in the toner supply container 345 of the developing device 340. Although not shown in the figure, the developing device 340 may further include a supplying roller to supply the developer accommodated in the toner supply container to the developing roller 343, a regulation member attached to the surface of the developing roller 343 to control the amount of the developer supplied to the developing area where the photosensitive drum 341 and the developing roller 343 face each other, and an agitating member to agitate the developer contained in the toner supply container.

The transfer device 370 may include an intermediate transfer belt 371, an intermediate transfer roller 372, and a transfer roller 373. Toner images developed on the photosensitive drums 341 of each of the developing devices 340C, 340M, 340Y, and 340K may be intermittently transferred to the intermediate transfer belt 371. The intermediate transfer belt 371 may be supported by support rollers 374 and 375 and may be circulated.

The intermediate transfer belt 371 may be a member on which a toner image is formed on the surface, and the surface on which the toner image is formed may be movable toward the transfer roller 373. The intermediate transfer belt 371 may function as an image transport member that carries the toner image.

The four intermediate transfer rollers 372 may be arranged in positions facing each of the developing devices 340C, 340M, 340Y, and 340K with the intermediate transfer belt 371 therebetween. An intermediate transfer bias voltage may be applied to the four intermediate transfer rollers 372 to intermediately transfer the toner image developed on the photosensitive drum 341, onto the intermediate transfer belt 371. Instead of the intermediate transfer roller 372, a corona transfer device or a pin scorotron-type transfer device may be used. The transfer roller 373 may be located to face the intermediate transfer belt 371. A transfer bias voltage for transferring the toner image intermediately transferred on the intermediate transfer belt 371 to the print medium P may be applied to the transfer roller 373.

The overlappingly transferred toner images on the intermediate transfer belt 371 may be transferred to the print medium P by the transfer bias voltage applied to the transfer roller 373.

The fuser 1 may fuse the toner image to the print medium P by adding heat and pressure to the print medium P to which the toner image is transferred.

It should be understood that examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. A fuser comprising:

a flexible fusing belt;

a backup member located outside the fusing belt to form a fusing nip with the fusing belt;

a heater substrate having a first surface including a heating element pattern and a second surface, opposite to the first surface, to heat the fusing belt in the fusing nip; and a heat conduction member in contact with the first surface of the heater substrate to distribute the heat of the heater substrate, wherein the heating element pattern includes a first heating element having a first length greater than a width of a first print medium, and a second heating element having a second length greater than a width of a second print medium and greater than the first length, wherein the first heating element includes a first heating area to overlap with the first print medium, and a second heating area that does not overlap with the first print medium and extends from end portions of the first heating area, wherein a portion of the heat conduction member overlaps with the second heating area, wherein the heat conduction member includes a pair of heat conduction segments and wherein an interval between the pair of heat conduction segments is less than the width of the first print medium.

2. The fuser of claim 1, wherein each heat conduction segment includes a first heat conduction area that overlaps with the second heating area, and the second heat conduction area that extends from an end portion of the first heat conduction area and does not overlap with the first heating element.

3. The fuser of claim 2, wherein a width of the first heat conduction area in a long side direction is 3 mm to 5 mm.

4. The fuser of claim 2, wherein each heat conduction segment further includes a third heat conduction area that extends from another end portion of the first heat conduction area and overlaps with the first heating area.

5. The fuser of claim 4, wherein each heat conduction segment has a shape that accommodates the first heat conduction area, the second heat conduction area, and the third heat conduction area.

6. The fuser of claim 4, wherein a width along a long side direction of the third heat conduction area corresponds to a width along the long side direction of the first heat conduction area.

7. The fuser of claim 1, wherein the heat conduction member has a height to overlap with the first heating element and the second heating element.

8. The fuser of claim 7, wherein the height of the heat conduction member is greater than a sum of a height of the first heating element, a height of the second heating element, and an interval between the first heating element and the second heating element.

9. The fuser of claim 1, wherein the heater substrate is to heat the fusing belt in the fusing nip to heat a third print medium larger than the second print medium, wherein the heating element pattern further includes a third heating element that has a third length greater than a width of the third print medium and greater than the second length.

10. The fuser of claim 9, wherein the heat conduction member has the height to overlap with the first heating element, the second heating element, and the third heating element.

11. An image forming apparatus comprising:

an image forming unit to transfer a toner image to at least one of a first print medium or a second print medium that has a greater width than the first print medium; and a fuser to fuse the toner image on the first print medium or the second print medium by applying heat and pressure to the first print medium or the second print medium onto which the toner image is transferred, wherein the fuser comprises:

a flexible fusing belt;

a backup member located outside the fusing belt to form a fusing nip with the fusing belt;

a heater substrate having a first surface including a heating element pattern and a second surface, opposite to the first surface, to heat the fusing belt in the fusing nip; and a heat conduction member in contact with the first surface of the heater substrate to distribute the heat of the heater substrate, wherein the heating element pattern includes a first heating element having a first length greater than a width of the first print medium, and a second heating element having a second length greater than a width of the second print medium and greater than the first length, wherein the first heating element includes a first heating area to overlap with the first print medium, and a second heating area that does not overlap with the first print medium and extends from end portions of the first heating area, wherein a portion of the heat conduction member overlaps with the second heating area, wherein the heat conduction member includes a pair of heat conduction segments and a third heat conduction area, and wherein an interval between the pair of heat conduction segments is less than the width of the first print medium.

12. The image forming apparatus of claim 11, wherein each heat conduction segment includes a first heat conduction area that overlaps with the second heating area, and the second heat conduction area that extends from an end portion of the first heat conduction area and does not overlap with the first heating element.

13. The image forming apparatus of claim 12, wherein each heat conduction segment further includes a third heat conduction area that extends from another end portion of the first heat conduction area and overlaps with the first heating area.

14. The image forming apparatus of claim 13, wherein each heat conduction segment has a shape that accommodates the first heat conduction area, the second heat conduction area, and the third heat conduction area.

15. The image forming apparatus of claim 11, wherein the heater substrate is to heat the fusing belt in the fusing nip to heat a third print medium larger than the second print medium, wherein the heating element pattern further includes a third heating element that has a third length greater than a width of the third print medium and greater than the second length, wherein the heat conduction member has the height to overlap with the first heating element, the second heating element, and the third heating element.

* * * * *